United States Patent [19]
Bernloehr

[11] Patent Number: 5,465,633
[45] Date of Patent: Nov. 14, 1995

[54] FOOT ACTUATED TROLLING MOTOR CONTROL

[75] Inventor: Darrel A. Bernloehr, Mankato, Minn.

[73] Assignee: Johnson Fishing, Inc., Mankato, Minn.

[21] Appl. No.: 192,504

[22] Filed: Feb. 7, 1994

[51] Int. Cl.⁶ ............... G05G 1/14; F16C 1/10; B60L 15/20
[52] U.S. Cl. .............. 74/512; 74/560; 74/500.5; 74/501.5 R; 74/515 R; 114/153; 440/7
[58] Field of Search ............... 114/153; 440/7; 74/560, 512, 500.5, 515 R, 501.5 R

[56] References Cited

U.S. PATENT DOCUMENTS

| | | | |
|---|---|---|---|
| 3,561,393 | 2/1971 | Fortson | 74/515 R |
| 3,580,212 | 5/1971 | Fortson | 440/7 |
| 3,602,181 | 8/1971 | Harris | 114/153 |
| 3,606,858 | 9/1971 | Edwards et al. | 440/7 |
| 3,889,625 | 6/1975 | Roller et al. | 114/153 X |
| 3,930,461 | 1/1976 | Brock et al. | 440/7 |
| 4,348,193 | 9/1982 | Arndt | 114/153 X |
| 4,527,983 | 7/1985 | Booth | 74/512 X |
| 4,631,033 | 12/1986 | Menne | |
| 4,631,034 | 12/1986 | Menne et al. | |
| 4,820,208 | 4/1989 | Phillips | 440/7 |
| 4,850,916 | 7/1989 | Phillips | 114/153 X |
| 5,112,256 | 5/1992 | Clement | |
| 5,171,174 | 12/1992 | Mynster | 440/7 |

FOREIGN PATENT DOCUMENTS 653078 11/1962 Canada .................. 114/153

*Primary Examiner*—Vinh T. Luong
*Attorney, Agent, or Firm*—Foley & Lardner

[57] ABSTRACT

A pull-pull foot control device for controlling the angular position of a trolling motor mounted for pivotal movement on a boat. The device including a base plate mounted in a spaced relation to the trolling motor, a pedal pivotally mounted on the base plate with a pulley mounted on the base plate rearwardly of the foot pedal, a first cable having one end connected to the foot pedal and the other end connected to the trolling motor, and a second cable having one end connected to the foot pedal and the other end connected to the other side of the trolling motor, the second cable being wrapped around the pulley so that pivotal motion of the foot pedal in one direction will pull the trolling motor in one direction and pivotal motion in the other direction will pull the motor in the other direction.

8 Claims, 2 Drawing Sheets

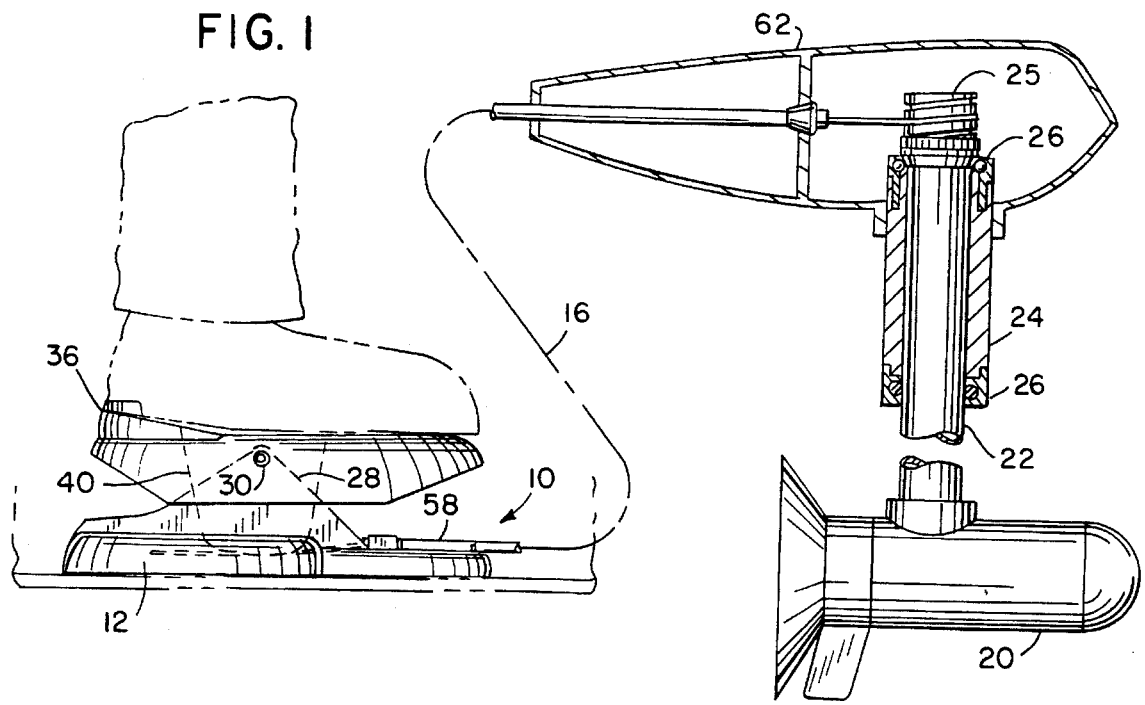
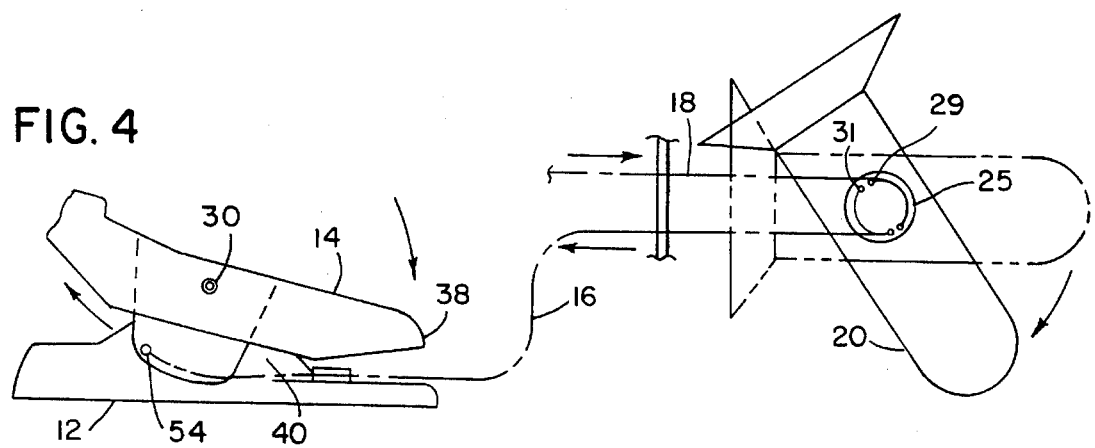
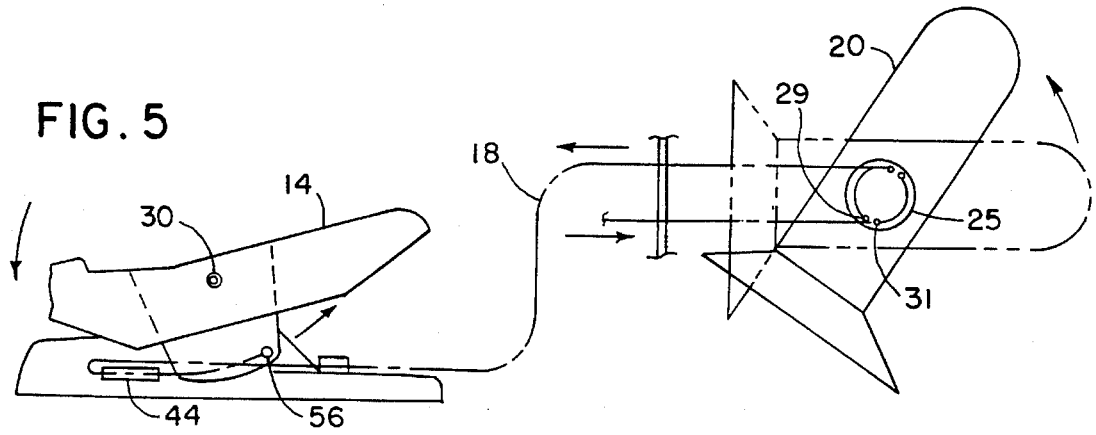

FOOT ACTUATED TROLLING MOTOR CONTROL

FIELD OF THE INVENTION

This invention is related generally to the control of trolling motors and more specifically to a foot pedal operated pull-pull cable system for controlling the position of an electric trolling motor.

BACKGROUND OF THE INVENTION

Various foot pedal devices have been used to control electric trolling motors without the use of your hands. Such foot pedal devices have been widely used to control bow mounted electric trolling motors.

Foot control devices of the prior art are often difficult to operate, more specifically it is difficult to obtain accurate controlled steering if substantial foot force must be applied just to get steering movement to start. This problem is made more acute by the fact that in certain devices of the prior art very small movements of the pedal will lead to major changes in steering direction which can result in oversteering.

SUMMARY OF THE PRESENT INVENTION

The present invention relates to a foot control device for a bow mounted electric trolling motor. The trolling motor is supported for pivotal movement by a pivot post having a cable drum mounted on the upper end of the post. The foot control device according to the present invention is of the type having a base with a pair of elevated support blocks and a pedal pivotally mounted on the support blocks with a segment or quadrant suspended from the bottom of the pedal. First and second pull cables extend in opposite directions from the segment for connection to the cable drum. The foot control segment has a pivot point spaced upwardly from the plane of the base to allow space for the pivotal movement of the segment or quadrant. An arcuate surface is provided on the bottom of the segment which is located in close proximity to the plane of the base. The segment has a radius of approximately three inches which provides sufficient leverage to impose a turning force on the pivot post supporting the trolling motor.

More particularly, cable terminations are provided on each end of the arcuate surface on the bottom of the segment. The first cable has one end connected to the back of the segment and the other end to one side of the cable drum. The other cable has one end connected to the front of the segment and the other end wrapped around a pulley and connected to the other side of the cable drum. The cable ends connected to the segment are spaced at equal distances from a vertical line passing through the pivot point of the pedal. The other ends of the cables are wrapped around opposite sides of the cable drum. It should be noted that with this arrangement the trolling motor can be rotated in an arc of approximately 180° in either direction with a minimum of movement of the pedal.

One of the principal objects of the invention is to minimize the amount of movement of the foot pedal required to steer the motor.

Another object is to provide a foot control device for a trolling motor which can be operated for long periods with little ankle stress.

One of the primary advantages of the invention is the use of a pull-pull system to maintain the position of the trolling motor and thereby allow the fisherman to fish from different positions in the boat.

Other principal features and advantages of the invention will become apparent to those skilled in the art upon review of the following drawings, the detailed description and the appended claims.

BRIEF DESCRIPTION OF THE DRAWINGS

FIG. 1 is a schematic view of the foot pedal control device according to the present invention shown connected to the cable drum on the end of the pivot post supporting the trolling motor;

FIG. 4 is a schematic view showing the position of the trolling motor with the foot pedal in the forward position; and FIG. 5 is a schematic view showing the position of the trolling motor with the foot pedal in the rearward position.

Figure 2:
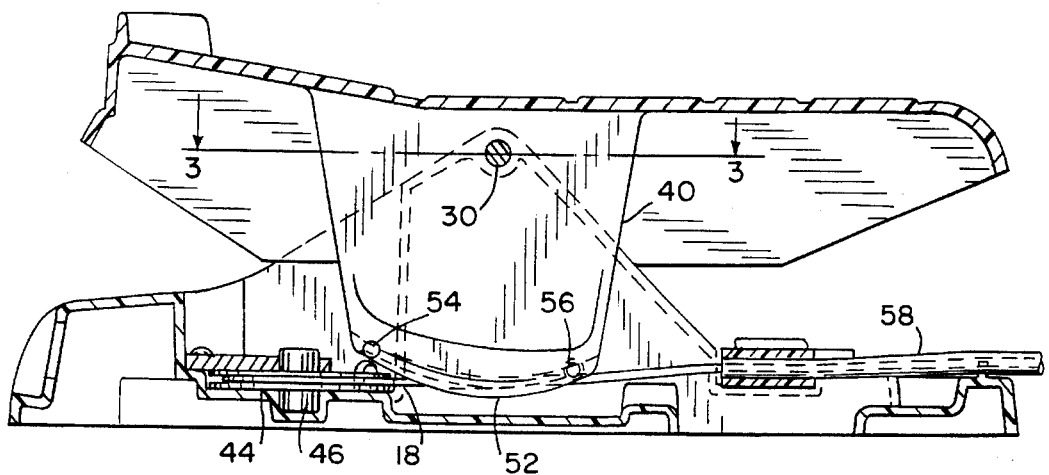
FIG. 2 is a cross section view of the foot pedal control device.
Figure 3:
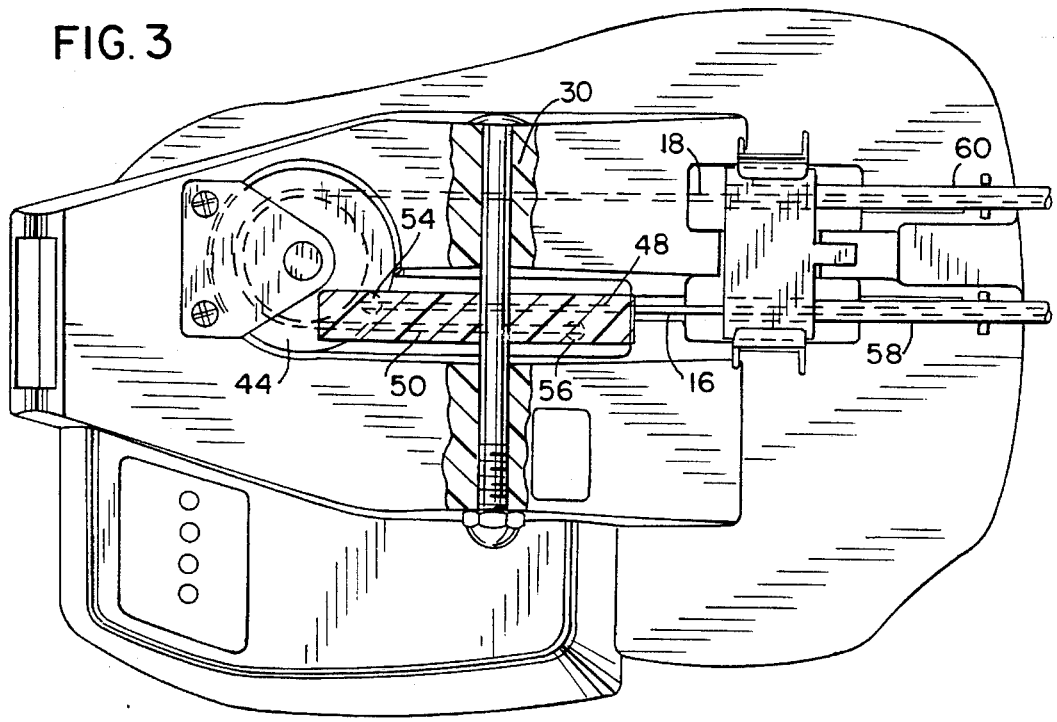
FIG. 3 is a view taken on line 3—3 of FIG. 2.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

The foot pedal control device 10 according to the present invention is connected to a trolling motor assembly 15 as shown in FIGS. 1, 4 and 5. The trolling motor assembly 15 generally includes a trolling motor 20 mounted on the lower end of a pivot post 22 which is supported by roller bearing assemblies 26 for rotary motion in a hollow tube 24 mounted on the hull of the boat. A cable drum 25 having a spiral groove 27 is mounted on the top of the post 22. A first opening 29 is provided at the upper end of groove 27 and a second opening 31 at the bottom of groove 27. The foot pedal control device includes a base 12, a foot pedal 14, and a pair of cables 16 and 18 connecting the foot pedal 14 to the cable drum 25.

The foot pedal 14 is pivotally mounted on a pair of elevated support members 28 provided on the top of the base 12 by means of a pin 30. The pin 30 provides a horizontal pivot axis spaced above the planar surface of the base 12. The foot pedal 14 includes a foot contact surface 34 which is spaced just above the pivot pin 30. The foot contact surface 34 of pedal 14 includes a ridge 36 around the back of the foot contact surface 34 to accommodate the heal of the operator's shoe and a flange 38 depending from the edge of the contact surface. It should be noted that the foot contact surface 34 of the pedal is located in close proximity to the pivot pin 30 which minimizes the amount of motion required to control the position of the trolling motor 20.

Means are provided on the bottom of the foot pedal 14 for connecting the foot pedal to the trolling motor assembly 15. Such means is in the form of a quadrant or segment 40 mounted on the bottom of the foot pedal 14. The quadrant 40 extends downwardly from the bottom of the foot pedal 14 between the support members 28. A curved surface 52 is provided on the bottom of the quadrant 40 which is tangent to the plane of the base 12. A pair of grooves 48 and 50 are provided in the curved surface 52 on the bottom of the quadrant 40. A port or hole 54 is provided at the back end of groove 48 and a port or hole 56 is provided at the forward end of groove 50. A pulley 44 is mounted on pin 46 and is located in a parallel relation to the plane of the base 12 rearwardly of the quadrant 40. It should be noted that one side of the pulley 44 is aligned with the groove 50 on the bottom of the quadrant 40.

A pair of cable sheaths 58 and 60 are connected to the front of the base 12 and to the back of housing 62 for the trolling motor 20. The first cable 16 is passed through the sheath 58 with one end wrapped around the spiral groove 27 in the cable drum in one direction and connected to the first opening 29 at the top of the cable drum 25. The other end of cable 16 is connected to the hole 54 in alignment with the groove 48. The second cable 18 is passed through sheath 60 with one end wrapped around the groove 27 in the opposite direction and connected to the second opening 31 at the bottom of cable drum 25. The cable 18 is wrapped around the pulley 44 and connected to the hole 56 at the opposite end of the groove 50. The cable sheaths 58 and 60 provide sufficient drag to hold the trolling motor in position when the operator takes his foot off of the pedal.

It should be noted that a small movement of the foot pedal, either forward or backward, will turn the trolling motor 180° in either direction. In this regard, the cable drum 25 has a diameter of approximately one inch. The distance between the openings 54 and 56 in the quadrant 40 is approximately equal to the circumference of the cable drum. With this arrangement, the bottom of the quadrant has to move only halfway to rotate the drum 180°.

Thus, it should be apparent that there has been provided in accordance with the present invention a foot actuated trolling motor control that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A pull-pull foot control device for controlling the angular position of a trolling motor, said device comprising a base mounted in a spaced relation to the trolling motor, a pedal pivotally mounted on the base, a pulley mounted on the base in spaced relation to the foot pedal, a first cable having one end connected to one end of said foot pedal and the other end operatively connected to the trolling motor, a second cable wrapped around said pulley with one end connected to the other end of said foot pedal and the other end operatively connected to the trolling motor, whereby pivotal motion of the foot pedal in one direction will pull the trolling motor in one direction and pivotal motion of the foot pedal in the opposite direction will pull the motor in the opposite direction.

2. The control device according to claim 1, wherein said base includes a pair of support blocks for supporting said pedal, said pedal including a quadrant extending downwardly from the bottom of said foot pedal, said quadrant including a curved surface at the bottom, a first opening at the back end of said quadrant and a second opening at the front end of said quadrant, said first cable being connected to said first opening and said second cable being connected to said second opening.

3. The control device according to claim 2 including a cable drum operatively connected to said trolling motor, said first cable being wrapped around said cable drum in one direction and said second cable being wrapped around said cable drum in the opposite direction whereby pivotal movement of the pedal in one direction will cause the first cable to pull the motor in one direction and pivotal movement of the foot pedal in the opposite direction will pull the trolling motor in the opposite direction.

4. The control device according to claim 3 wherein the distance between the first and second openings in the quadrant is approximately equal to the circumference of said cable drum whereby pivotal movement of said quadrant halfway between said openings will rotate the trolling motor halfway in one direction and pivotal movement of said quadrant halfway between said openings in the opposite direction will rotate the trolling motor halfway in the opposite direction.

5. A foot pedal control assembly for controlling the angular position of a trolling motor secured to the lower end of a pivot post which is mounted for pivotal movement in a hollow support tube, the control assembly including a cable drum mounted on the upper end of the pivot post, a base plate mounted in a spaced relation from the tube, a foot pedal mounted on said base plate and having a quadrant extending downwardly from the pedal, said quadrant including a curved surface on the bottom thereof, a first cable mounted on said curved surface and operatively connected to one side of said cable drum to pull the trolling motor in one direction, a second cable mounted on said curved surface and operatively connected to the other side of said cable drum to pull the trolling motor in the opposite direction, and a pulley mounted on said base plate in alignment with said second cable, said second cable being wrapped around said pulley whereby said second cable will pull the trolling motor in the opposite direction to the direction of motion when pulled by the first cable.

6. The control assembly according to claim 5 wherein said cable drum includes a spiral groove on the outer perimeter, said first cable being aligned in said groove to rotate the trolling motor in one direction and said second cable being aligned in said groove to rotate the trolling motor in the opposite direction.

7. The control device according to claim 6 wherein said pedal is pivotally connected to said base plate at the top of the quadrant and the cables are connected to the quadrant in a spaced relation to the pedal whereby a small movement of the pedal will produce a turning motion of the trolling motor.

8. The control device according to claim 7 including means for producing a drag on said cables whereby said trolling motor will remain in place when the fisherman removes his foot from the pedal.

* * * * *